United States Patent
Tatsushima et al.

(10) Patent No.: US 11,597,136 B2
(45) Date of Patent: Mar. 7, 2023

(54) FILAMENT WINDING APPARATUS AND FILAMENT WINDING METHOD

(71) Applicant: HONDA MOTOR CO., LTD., Tokyo (JP)

(72) Inventors: Kosuke Tatsushima, Wako (JP); Yohei Noji, Wako (JP); Kenta Umetsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 86 days.

(21) Appl. No.: 17/198,597

(22) Filed: Mar. 11, 2021

(65) Prior Publication Data

US 2021/0283825 A1 Sep. 16, 2021

(30) Foreign Application Priority Data

Mar. 13, 2020 (JP) .............................. JP2020-043954

(51) Int. Cl.
*B29C 53/60* (2006.01)
*B29C 53/80* (2006.01)
*B29L 31/00* (2006.01)

(52) U.S. Cl.
CPC ........ *B29C 53/602* (2013.01); *B29C 53/8016* (2013.01); *B29C 53/8041* (2013.01); *B29C 2053/8025* (2013.01); *B29L 2031/7156* (2013.01); *F17C 2209/2154* (2013.01)

(58) Field of Classification Search
CPC .................................................. B29C 53/602
See application file for complete search history.

(56) References Cited

U.S. PATENT DOCUMENTS

2019/0151971 A1 5/2019 Ito et al.

FOREIGN PATENT DOCUMENTS

| CN | 108367372 A | | 8/2018 |
| CN | 108621450 A | * | 10/2018 |
| JP | 2007-268817 A | * | 10/2007 |
| JP | 2007-268817 A | | 10/2007 |
| JP | 2018-192652 A | * | 12/2018 |

OTHER PUBLICATIONS

Machine Translation of Japanese Patent 2007-268817, Date Unknown.*
Machine Translation of Japanese Patent 2018-192652, Date Unknown.*
Machine Translation of Chinese Patent 108621450, Date Unknown.*
Office Action including search report dated Aug. 16, 2022 issued over the corresponding Chinese Patent Application No. 202110275118.5 with the English translation thereof.

* cited by examiner

*Primary Examiner* — Jeffry H Aftergut
(74) *Attorney, Agent, or Firm* — Carrier Shende & Associates, P.C.; Fulchand P. Shende; Joseph P. Carrier (57) ABSTRACT

A winding section of a filament winding apparatus winds a fiber bundle around a filament-wound member. A tension acquisition part acquires a detected winding-tension value. A supply-speed acquisition part acquires a detected supply-speed value. A storage part stores correlation information in which an allowable determination range of winding tension is set in relation to the supply speed. A determination part determines whether the winding of the fiber bundle is successful or unsuccessful by comparing detected-value information, including the detected winding-tension value and the detected supply-speed value associated with each other, with the correlation information.

8 Claims, 7 Drawing Sheets

FILAMENT WINDING APPARATUS AND FILAMENT WINDING METHOD

CROSS-REFERENCE TO RELATED APPLICATION

This application is based upon and claims the benefit of priority from Japanese Patent Application No. 2020-043954 filed on Mar. 13, 2020, the contents of which are incorporated herein by reference.

BACKGROUND OF THE INVENTION

Field of the Invention

The present invention relates to a filament winding apparatus and a filament winding method of winding a resin-impregnated fiber bundle around a filament-wound member.

Description of the Related Art

Filament winding apparatuses (hereinafter also referred to as "FW apparatuses") for winding resin-impregnated fiber bundles around filament-wound members are well known. Examples of such filament-wound members include liners constituting pressure vessels. In this case, fiber-reinforced resin layers that cover and reinforce the liners can be formed by winding fiber bundles around the outer surfaces of the liners using the FW apparatuses.

In the FW apparatuses of this type, winding tension of the fiber bundles often changes according to the supply speed of the fiber bundles supplied to the filament-wound members or the winding position of the fiber bundles on the filament-wound members. It can be determined that the winding of the fiber bundles is successful while the winding tension of the fiber bundles changes within allowable determination ranges set according to the supply speed or the winding position in advance.

For example, in a method and an apparatus proposed in Japanese Laid-Open Patent Publication No. 2007-268817, the winding tension of a fiber bundle is continuously recorded while the fiber bundle is wound around a filament-wound member, and a tension curve (FIG. 7) is created to determine whether the winding of the fiber bundle is successful or unsuccessful on the basis of the tension curve.

SUMMARY OF THE INVENTION

Figure 7:
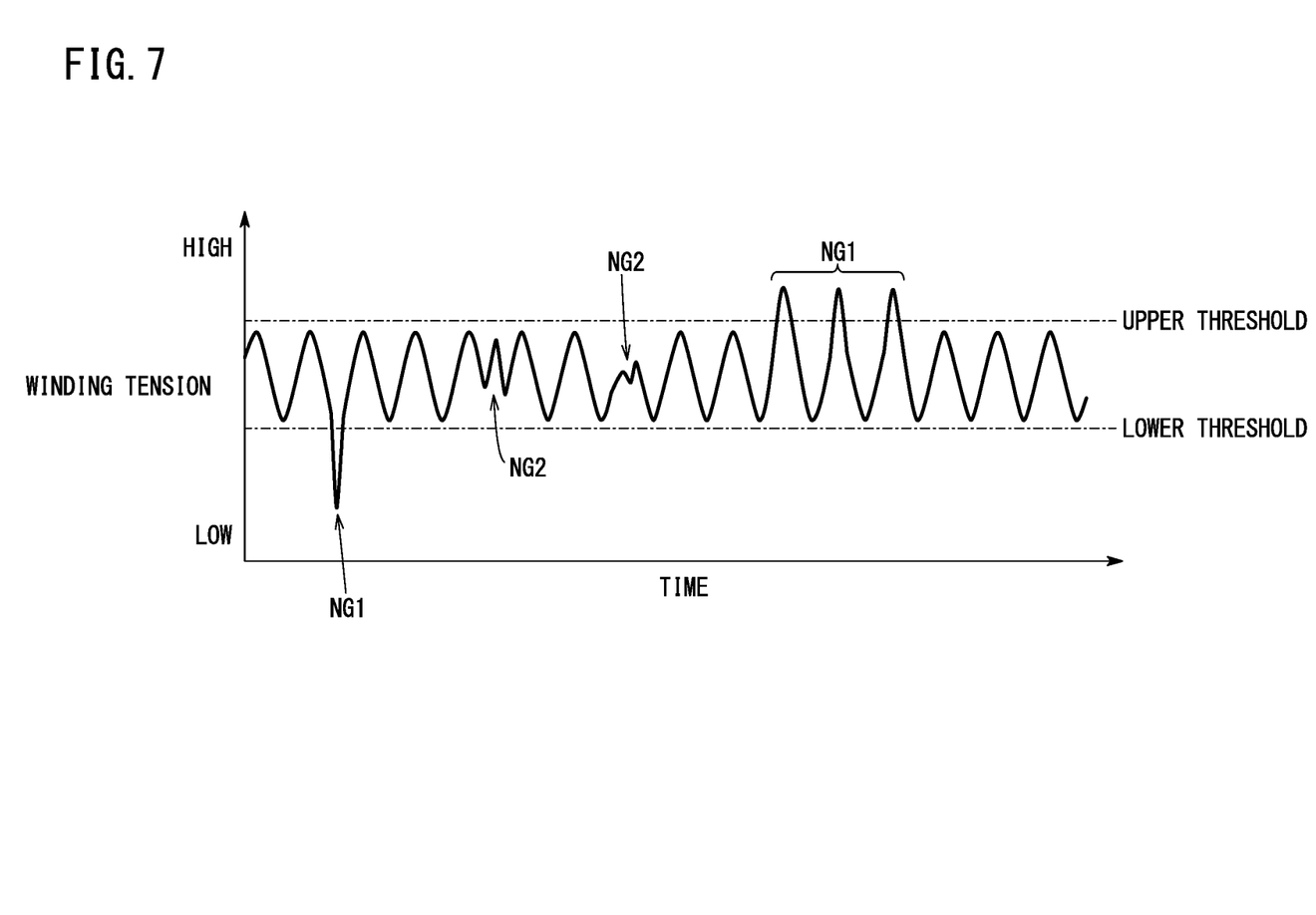
FIG. 7 illustrates a tension curve obtained by continuously recording the winding tension of a fiber bundle and upper and lower thresholds of the winding tension.

In a case where such determination based on the tension curve is performed by a determination part or the like on a computer, it is conceivable that upper and lower thresholds of the winding tension are set as illustrated in, for example, FIG. 7, and that the tension curve is compared with the upper and lower thresholds. According to this comparison, it can be determined that the fiber bundle is wound unsuccessful when points above the upper threshold or below the lower threshold are detected in the tension curve as shown by, for example, NG1 in FIG. 7.

However, the actual allowable determination range of the winding tension changes according to the supply speed and the winding position of the fiber bundle. Thus, it cannot be determined that the winding of the fiber bundle is unsuccessful when the winding tension is out of the allowable determination range as shown by, for example, NG2 in FIG. 7, although the winding tension is still between the upper and lower thresholds. That is, it cannot be accurately determined whether the winding of the fiber bundle is successful or unsuccessful only by comparing the tension curve with the upper and lower thresholds of the winding tension as described above.

The present invention has been devised taking into consideration the aforementioned problem, and has the object of providing a filament winding apparatus and filament winding method enabling accurate determination of whether winding of a fiber bundle is successful or unsuccessful.

According to an aspect of the present invention, a filament winding apparatus that winds a fiber bundle impregnated with resin around a filament-wound member comprises a winding section configured to wind the fiber bundle around the filament-wound member; a tension acquisition part configured to detect a winding tension of the fiber bundle wound by the winding section to acquire a detected winding-tension value; a supply-speed acquisition part configured to detect a supply speed of the fiber bundle wound by the winding section to acquire a detected supply-speed value; a storage part configured to store correlation information in which an allowable determination range of the winding tension is set in relation to the supply speed; and a determination part configured to determine whether winding of the fiber bundle is successful or unsuccessful by comparing detected-value information, including the detected winding-tension value and the detected supply-speed value associated with each other, with the correlation information.

According to an aspect of the present invention, a filament winding apparatus that winds a fiber bundle impregnated with resin around a filament-wound member comprises a winding section configured to wind the fiber bundle around the filament-wound member; a tension acquisition part configured to detect a winding tension of the fiber bundle wound by the winding section to acquire a detected winding-tension value; a winding-position acquisition part configured to detect a winding position of the fiber bundle wound by the winding section to acquire a detected winding-position value; a storage part configured to store correlation information in which an allowable determination range of the winding tension is set in relation to the winding position; and a determination part configured to determine whether winding of the fiber bundle is successful or unsuccessful by comparing detected-value information, including the detected winding-tension value and the detected winding-position value associated with each other, with the correlation information.

According to an aspect of the present invention, a filament winding method of winding a fiber bundle impregnated with resin around a filament-wound member comprises a winding step of winding the fiber bundle around the filament-wound member; a detected-value acquiring step of acquiring a detected winding-tension value by detecting a winding tension of the fiber bundle in the winding step and acquiring a detected supply-speed value by detecting a supply speed of the fiber bundle in the winding step; and a determining step of determining whether winding of the fiber bundle is successful or unsuccessful by comparing detected-value information, including the detected winding-tension value and the detected supply-speed value acquired in the detected-value acquiring step associated with each other, with correlation information in which an allowable determination range of the winding tension is set in relation to the supply speed.

According to an aspect of the present invention, a filament winding method of winding a fiber bundle impregnated with resin around a filament-wound member comprises a winding step of winding the fiber bundle around the filament-wound member; a detected-value acquiring step of acquiring a detected winding-tension value by detecting a winding tension of the fiber bundle in the winding step and acquiring a detected winding-position value by detecting a winding position of the fiber bundle in the winding step; and a determining step of determining whether winding of the fiber bundle is successful or unsuccessful by comparing detected-value information, including the detected winding-tension value and the detected winding-position value acquired in the detected-value acquiring step associated with each other, with correlation information in which an allowable determination range of the winding tension is set in relation to the winding position.

In the present invention, the correlation information in which the allowable determination range of the winding tension is set in relation to the supply speed or the winding position of the fiber bundle wound around the filament-wound member is determined in advance. Then, the detected-value information is acquired by associating the detected winding-tension value and the detected supply-speed value or the detected winding-position value with each other, the values being obtained when the fiber bundle is actually wound around the filament-wound member. Subsequently, it is determined whether the winding of the fiber bundle is successful or unsuccessful by comparing the detected-value information with the correlation information.

With this, it can be determined whether the winding tension is within the allowable determination range corresponding to the supply speed or the winding position of the fiber bundle. As a result, it can be accurately determined whether the winding of the fiber bundle is successful or unsuccessful compared with a case where, for example, a tension curve obtained by continuously recording the winding tension of a fiber bundle is compared with upper and lower thresholds of the winding tension.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a filament winding apparatus and a filament winding method according to the present invention will be described in detail below with reference to the accompanying drawings. In the drawings below, the same reference numbers and symbols are used for components having identical or similar functions and effects, and the repeated descriptions may be omitted.

A filament winding apparatus (hereinafter also referred to as "FW apparatus") 10 according to a first embodiment of the present invention illustrated in FIG. 1 will now be described. In the example below, a liner 14 constituting a pressure vessel 12 in FIG. 2 serves as an object to be wound with fiber bundles (filament-wound member) 16. For example, the pressure vessel 12 is filled with high-pressure hydrogen gas and installed in the body of an automobile (not illustrated) together with a fuel cell (not illustrated) to which the hydrogen gas is supplied.

Figure 2:
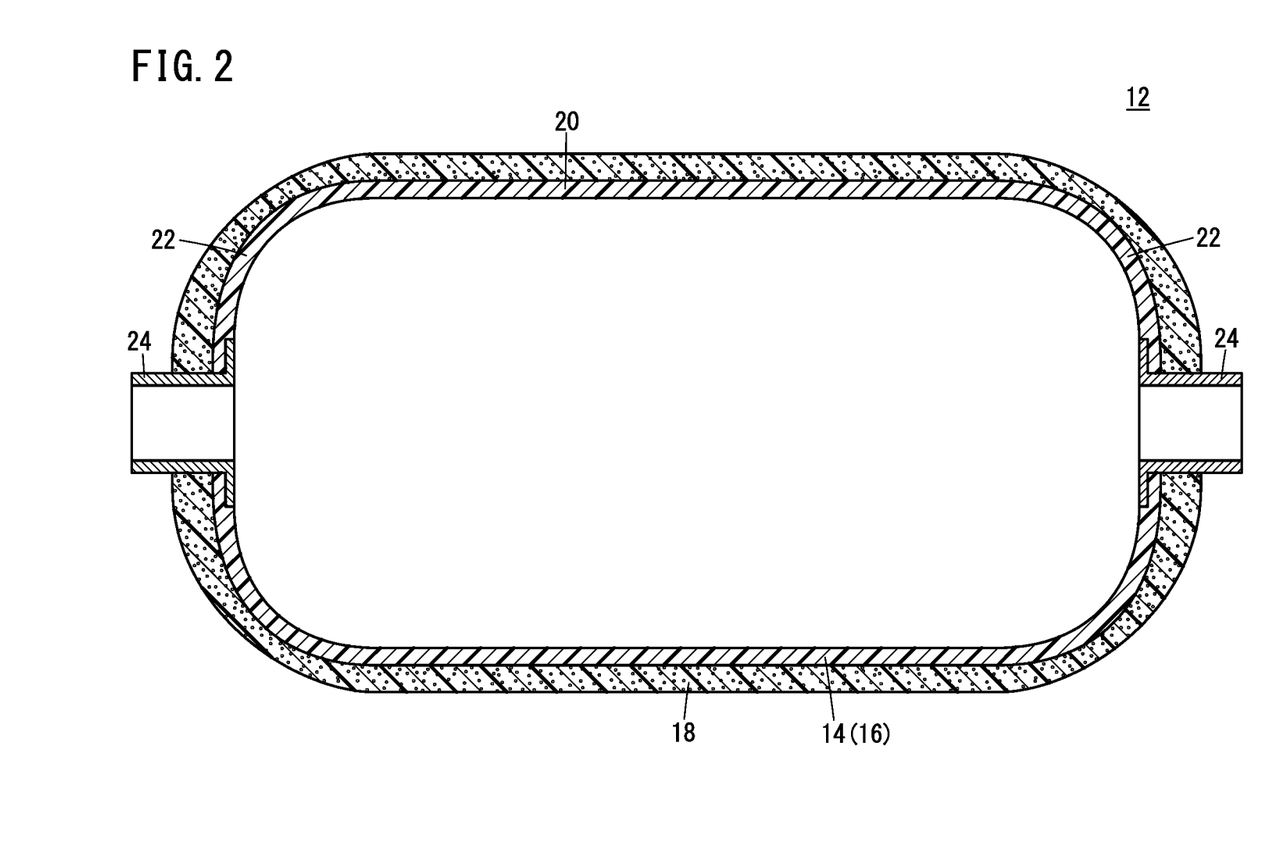
FIG. 2 is a schematic cross-sectional view of a pressure vessel obtained by winding a fiber bundle around a filament-wound member using the filament winding apparatus in FIG. 1.

As illustrated in FIG. 2, the pressure vessel 12 includes the liner 14 and a fiber-reinforced resin layer 18 covering the liner 14. The liner 14 includes a tubular portion 20 of which diameter is substantially equal in the axial direction and hemispherical portions 22 provided at both axial ends of the tubular portion 20. Materials suitable for the liner 14 include thermoplastic resin with hydrogen barrier properties such as high-density polyethylene. The liner 14 has an opening at either end in which a cap 24 is fitted.

Figure 1:
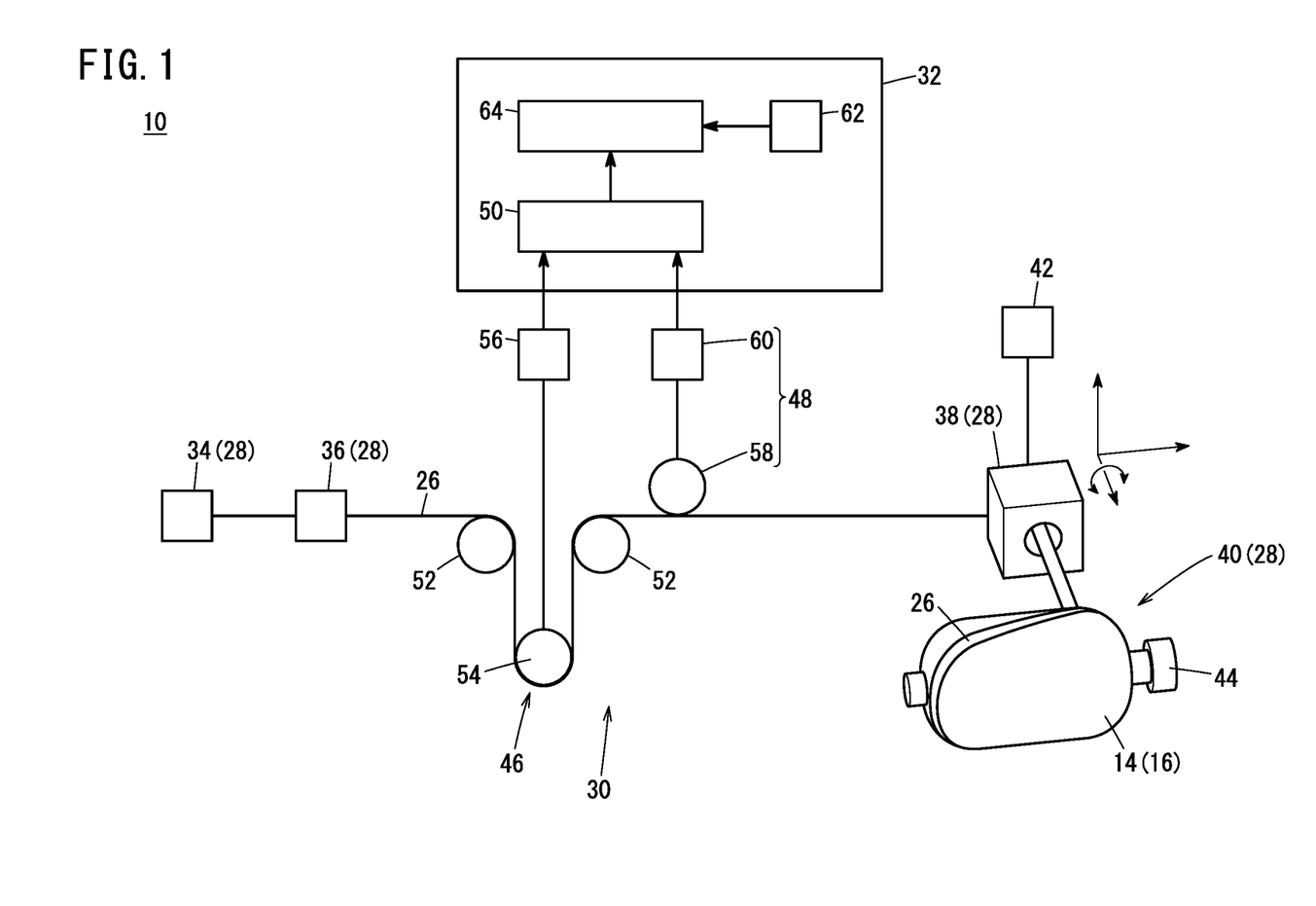
FIG. 1 is a schematic general view of a filament winding apparatus according to a first embodiment of the present invention.

The fiber-reinforced resin layer 18 is formed by winding a band-like, resin-impregnated fiber bundle (tow prepreg) 26 in FIG. 1 around the outer surface of the liner 14 to form a predetermined number of layers and then by curing the resin spread in the fiber bundle 26. The FW apparatus 10 according to this embodiment is configured to wind the fiber bundle 26 around the outer surface of the liner 14 to form the fiber-reinforced resin layer 18 of the pressure vessel 12. However, the FW apparatus 10 may be used to wind the fiber bundle 26 around the filament-wound member 16 other than the liner 14.

Example fibers constituting the fiber bundle 26 include carbon fiber, glass fiber, and aramid fiber. Example resins constituting the fiber bundle 26 include epoxy resin, phenol resin, and unsaturated polyester resin.

The FW apparatus 10 primarily includes a winding section 28, a detection section 30, and a control section 32. The winding section 28 includes an unwinding mechanism 34, a tension adjustment mechanism 36, a winding head 38, and a rotation support mechanism 40.

The unwinding mechanism 34 supplies the fiber bundle 26 to the liner 14. Known structures can be used for the unwinding mechanism 34. Thus, although not illustrated in detail, the unwinding mechanism 34 may include, for example, a creel that supports a bobbin around which the fiber bundle 26 is wound in advance, an unwinding roller that unwinds the fiber bundle 26 downstream in the conveying direction from the bobbin, and the like.

The tension adjustment mechanism 36 adjusts the tension of the fiber bundle 26 in the conveying direction while the fiber bundle 26 is unwound from the unwinding mechanism 34 to set the winding tension under which the fiber bundle 26 is wound around the liner 14 to a predetermined set value. Known structures can be used as the tension adjustment mechanism 36. Thus, although not illustrated in detail, the tension adjustment mechanism 36 may include, for example, a dancer roller that is in contact with the fiber bundle 26 in a direction intersecting with the conveying direction, a cylinder that presses the dancer roller against the fiber bundle 26 to apply a predetermined tension to the fiber bundle 26, and the like. Note that the structure of the tension adjustment mechanism 36 is not limited to the structure including the dancer roller and the cylinder. The winding head 38 guides the fiber bundle 26 unwound from the unwinding mechanism 34 to the liner 14. For example, the winding head 38 is supported by a support rail (not illustrated) to be movable in the axial direction of the liner 14 and in the horizontal and vertical directions orthogonal to the axial direction. The winding head 38 may be rotatable around an axis extending in the direction of extension of the fiber bundle 26 to be wound around the liner 14.

The position of the winding head 38 relative to the liner 14 is adjusted on the basis of control by the control section 32, and thereby the position of the fiber bundle 26 wound around the liner 14 (hereinafter also simply referred to as "winding position") is controlled. For example, the winding head 38 is provided with a winding-position acquisition part 42 that acquires a detected winding-position value by measuring the position of the winding head 38 relative to the liner 14. Note that the winding-position acquisition part 42 is not a required component for the FW apparatus 10 according to the first embodiment.

The rotation support mechanism 40 includes a support (not illustrated) that supports the liner 14 such that the liner 14 can rotate around its axis and a driving part 44 that rotates the liner 14. The fiber bundle 26 is unwound by the unwinding mechanism 34 while the winding head 38 is moved relative to the liner 14 that is rotated by the rotation support mechanism 40. This enables the fiber bundle 26 to be wound around the outer surface of the liner 14 while the winding position is being changed.

The control section 32 adjusts the number of rotations of the unwinding roller in the unwinding mechanism, the number of rotations of the liner 14 rotated by the driving part 44, and the like in the winding section 28 to set the speed of the fiber bundle 26 supplied to the liner 14 (hereinafter also simply referred to as "supply speed").

In the case where the liner 14 including the tubular portion 20 and the hemispherical portions 22 serves as the filament-wound member 16 as in this embodiment, for example, the supply speed is lower when the fiber bundle 26 is wound around the hemispherical portions 22 than when the fiber bundle 26 is wound around the tubular portion 20.

The detection section 30 acquires detected-value information including the detected value of the actual winding tension by the winding section 28 (detected winding-tension value) and the detected value of the actual supply speed by the winding section 28 (detected supply-speed value) associated with each other. Specifically, the detection section 30 includes a tension acquisition part 46, a supply-speed acquisition part 48, and a processing part 50.

The tension acquisition part 46 measures the actual winding tension of the fiber bundle 26 after the fiber bundle 26 passes through the tension adjustment mechanism 36 to acquire the detected winding-tension value. For example, the tension acquisition part 46 includes a pair of guide rollers 52 separated from each other in the conveying direction, a pressure roller 54 that applies pressure to part of the fiber bundle 26 between the guide rollers 52 in a direction intersecting with the conveying direction, and a tension sensor 56 that acquires the detected winding-tension value on the basis of the force exerted on the pressure roller 54 by the fiber bundle 26. The detected winding-tension value acquired by the tension sensor 56 is sent to the processing part 50 provided for the control section 32. The structure of the tension acquisition part 46 is not limited to the above, and the tension acquisition part 46 may have various structures enabling measurement of the winding tension.

The supply-speed acquisition part 48 is disposed adjacent to, for example, the tension acquisition part 46 and measures the actual supply speed of the fiber bundle 26 to acquire the detected supply-speed value. For example, the supply-speed acquisition part 48 includes a rotary roller 58 rotated by contact with the fiber bundle 26 while the fiber bundle 26 is conveyed and a speed sensor 60 that acquires the detected supply-speed value from the number of rotations of the rotary roller 58. The detected supply-speed value acquired by the speed sensor 60 is sent to the processing part 50 in the control section 32. The structure of the supply-speed acquisition part 48 is not limited to the above, and the supply-speed acquisition part 48 may have various structures enabling measurement of the supply speed. For example, the speed sensor 60 in the supply-speed acquisition part 48 may acquire the detected supply-speed value from the number of rotations of one of the guide rollers 52 in the tension acquisition part 46 instead of the rotary roller 58.

The processing part 50 acquires the detected-value information (black circles in FIG. 3) by associating the detected winding-tension value with the detected supply-speed value obtained when the detected winding-tension value is measured. The detection section 30 may acquire correlation between the detected supply-speed value and the detected winding-tension value shown by the black circles in FIG. 3 (hereinafter also referred to as "detected-values correlation") by respectively associating multiple results of the detected winding-tension value with multiple results of the detected supply-speed value using the processing part 50.

The control section 32 includes a storage part 62 and a determination part 64 in addition to the processing part 50. The control section 32 is configured as a computer provided with a CPU, memory, and the like (not illustrated). The CPU performs predetermined computations according to control programs to perform various operations and controls related to the FW apparatus 10. That is, the control section 32 receives detected signals from various sensors provided for the FW apparatus 10 and outputs drive signals to various components.

In this embodiment, the memory of the control section 32 can function as the storage part 62. Moreover, the CPU reads out and executes the control programs stored in the memory, and thereby hardware such as the CPU can function as the processing part 50 and the determination part 64 according to the control programs. The functions of the control section 32 are executed in software and may be executed in hardware on the basis of the circuit configuration provided for the control section 32.

The storage part 62 stores correlation information in which an allowable determination range of the winding tension is set in relation to the supply speed. In this embodiment, an ellipse shown by a broken line L1 in FIG. 3 indicates the correlation information, and the inside of the ellipse enclosed by the broken line L1 indicates the allowable determination range. That is, when the supply speed is V1, the allowable determination range of the winding tension is RV1. Moreover, when the supply speed is V2, the allowable determination range of the winding tension is RV2.

Figure 3:
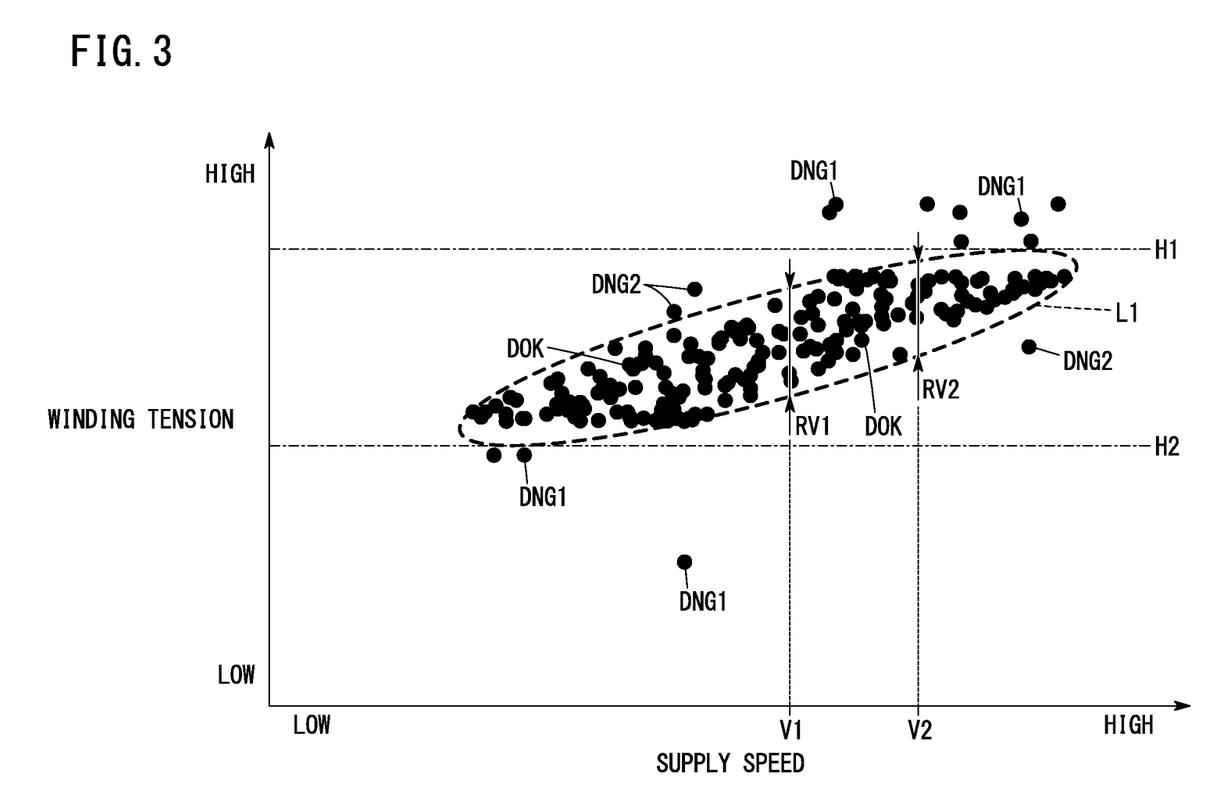
FIG. 3 illustrates detected-value information acquired by a detection section of the filament winding apparatus in FIG. 1 and correlation information set in advance.

The winding tension indicated by the allowable determination range is low when the supply speed is low, and is high when the supply speed is high. That is, the allowable determination range of the winding tension changes as the supply speed changes according to the winding of the fiber bundle 26 around the tubular portion 20 and the hemispherical portions 22 of the filament-wound member 16.

The determination part 64 determines whether the winding of the fiber bundle 26 is successful or unsuccessful by comparing the detected-value information obtained by the detection section 30 with the correlation information stored in the storage part 62. Specifically, the determination part 64 determines whether the detected winding-tension value in the detected-value information is in the allowable determination range of the correlation information at the supply speed (detected supply-speed value) associated with the detected winding-tension value. The determination part 64 may determine whether the winding of the fiber bundle 26 is successful or unsuccessful by comparing the detected-values correlation obtained by the detection section 30 with the correlation information stored in the storage part 62.

For example, the determination part 64 may determine whether one or more selected pieces of detected-value information shown by the black circles in FIG. 3 are in the set allowable range enclosed by the broken line L1, or may determine whether the detected-value information shown by the black circles in FIG. 3 are in the set allowable range enclosed by the broken line L1 entirely or at a percentage greater than or equal to a predetermined level.

When the detected-value information is within the set allowable range enclosed by the broken line L1 as shown by DOK in FIG. 3, the determination part 64 determines that the fiber bundle 26 is wound at the winding tension within the allowable determination range corresponding to the supply speed and that the winding is successful. When the detected-value information is out of the set allowable range enclosed by the broken line L1 as shown by DNG1 and DNG2 in FIG. 3, the determination part 64 determines that the fiber bundle 26 is wound at the winding tension above or below the allowable determination range corresponding to the supply speed and that the winding is unsuccessful.

The FW apparatus 10 according to this embodiment is basically configured as above. A filament winding method (hereinafter also referred to as "FW method") according to this embodiment will now be described with reference to FIGS. 1 to 4. In the example below, the fiber bundle is wound around the liner 14 serving as the filament-wound member 16 using the FW apparatus 10.

Figure 4:
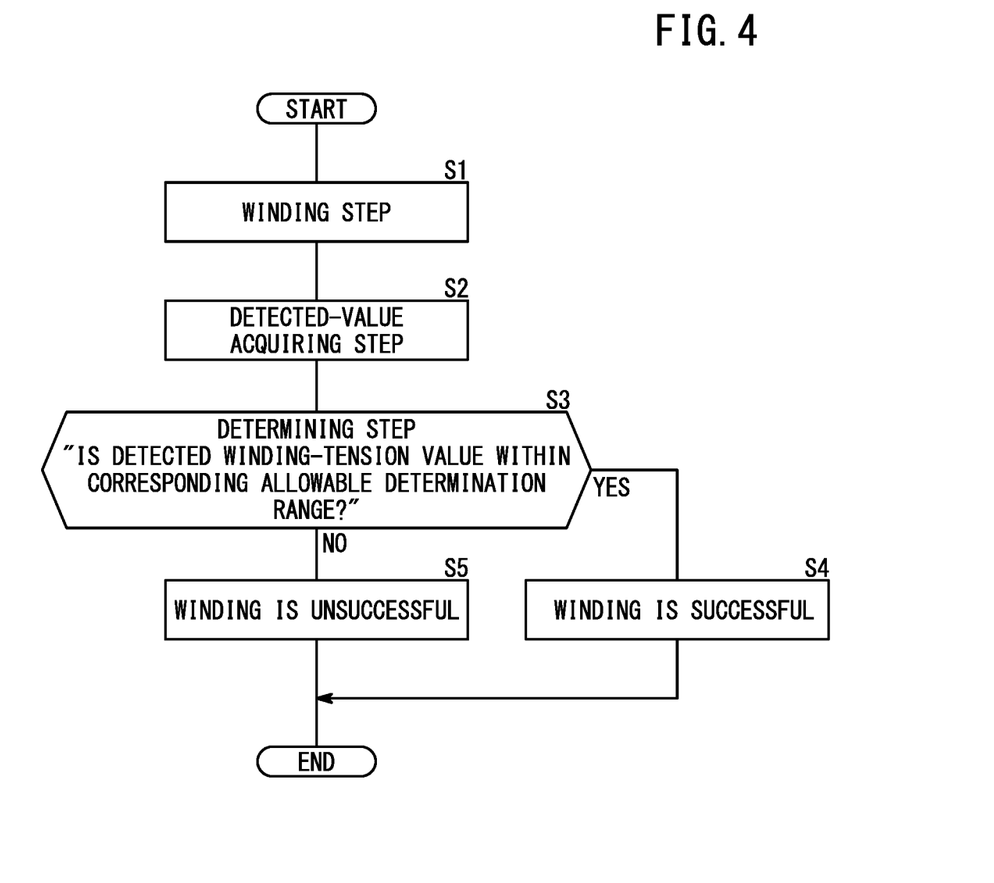
FIG. 4 is a flowchart illustrating a filament winding method of the present invention.

In the FW method, the fiber bundle 26 is wound around the liner 14 in a winding step (S1 in FIG. 4). In the winding step, the fiber bundle 26 is unwound toward the liner 14 by rotating the unwinding roller in the unwinding mechanism 34 and, at the same time, the fiber bundle 26 is wound around the liner 14 while the liner 14 is rotated by the driving part 44 of the rotation support mechanism 40. At this moment, the control section 32 performs, for example, hoop winding or helical winding on the liner 14 by moving the winding head 38 and changing the winding position.

For example, the supply speed is the highest (maximum speed) when the winding position is substantially in the middle of the tubular portion 20 in the axial direction, while the supply speed is the lowest (minimum speed) when the winding position is in the vicinity of the axial ends adjacent to the caps 24 in the hemispherical portions 22. The supply speed continuously changes between the maximum speed and the minimum speed according to the changes in the winding position.

As the supply speed changes according to the changes in the winding position as described above, the actual winding tension in the winding step also changes from the set value set by the tension adjustment mechanism 36. In this embodiment, the winding tension tends to be high when the supply speed increases, and tends to be low when the supply speed decreases.

Next, in a detected-value acquiring step (S2 in FIG. 4), the actual winding tension in the winding step is detected to acquire the detected winding-tension value, and the actual supply speed in the winding step is detected to acquire the detected supply-speed value. Subsequently, the detected winding-tension value and the detected supply-speed value acquired in the detected-value acquiring step are associated with each other to acquire the detected-value information.

Next, in a determining step (S3 in FIG. 4), the correlation information and the detected-value information are compared with each other to determine whether the winding of the fiber bundle 26 is successful or unsuccessful. In the determining step, it is determined whether the detected winding-tension value in the detected-value information is in the allowable determination range at the supply speed (detected supply-speed value) associated with the detected winding-tension value.

If it is determined that the detected winding-tension value in the detected-value information is within the allowable determination range described above (corresponding allowable determination range; YES in S3 in FIG. 4), it is determined that the winding is successful (S4 in FIG. 4). If it is determined that the detected winding-tension value in the detected-value information is out of the corresponding allowable determination range (NO in S3 in FIG. 4), it is determined that the winding is unsuccessful (S5 in FIG. 4).

The determining step of determining whether the winding of the fiber bundle 26 is successful or unsuccessful can be performed while the winding step is being performed or after the winding step is completed.

That is, the winding step is completed when the fiber bundle 26 wound around the outer surface of the liner 14 reaches the required thickness (number of layers) for forming the fiber-reinforced resin layer 18. In the case where the determining step is performed after the winding step is completed, multiple pieces of detected-value information, including multiple results of the detected supply-speed value and multiple results of the detected winding-tension value acquired in the detected-value acquiring step respectively associated with each other, are recorded. The resulting detected-values correlation may be compared with the correlation information to determine whether the winding is successful or unsuccessful.

As described above, in the FW apparatus 10 and the FW method according to the first embodiment, the correlation information in which the allowable determination range of the winding tension is set in relation to the supply speed is determined in advance. Then, the detected-value information is acquired by associating the detected winding-tension value and the detected supply-speed value with each other, the values being obtained when the fiber bundle 26 is actually wound around the liner 14. Subsequently, it is determined whether the winding of the fiber bundle 26 is successful or unsuccessful by comparing the detected-value information with the correlation information.

For example, in the case where the detected-value information is within the allowable determination range enclosed by the broken line L1 indicating the correlation information as shown by DOK in FIG. 3, it is determined that the winding is successful. On the other hand, in the case where the detected-value information is out of the allowable determination range enclosed by the broken line L1 indicating the correlation information as shown by DNG1 and DNG2 in FIG. 3, it is determined that the winding is unsuccessful.

For example, when the detected-value information is compared with an upper threshold H1 and a lower threshold H2 of the winding tension shown by alternate long and short dash lines in FIG. 3, it can be determined that the winding is unsuccessful on the basis of the detected-value information shown by DNG1 only. That is, it cannot be determined that the winding is unsuccessful on the basis of the detected-value information shown by DNG2.

By contrast, in the FW apparatus 10 and the FW method according to the first embodiment, it can be determined that the winding is unsuccessful on the basis of not only the detected-value information shown by DNG1 but also the detected-value information shown by DNG2 between the upper threshold H1 and the lower threshold H2 as described above. In this manner, it can be accurately determined whether the winding of the fiber bundle 26 is successful or unsuccessful as it can be determined whether the detected winding-tension value is within the allowable determination range that changes according to the supply speed of the fiber bundle 26.

In the FW apparatus 10 according to the first embodiment, the filament-wound member 16 corresponds to the liner 14 constituting the pressure vessel 12 and including the tubular portion 20 and the hemispherical portions 22, and the supply speed at the hemispherical portions 22 is lower than the supply speed at the tubular portion 20. Moreover, in the FW method according to the first embodiment, the filament-wound member 16 corresponds to the liner 14 constituting the pressure vessel 12 and including the tubular portion 20 and the hemispherical portions 22, and the supply speed at the hemispherical portions 22 is lower than the supply speed at the tubular portion 20 in the winding step. It can be accurately determined whether the winding is successful or unsuccessful effectively, in particular, in the case where the supply speed of the fiber bundle 26 wound around the liner 14 serving as the filament-wound member 16 changes.

A FW apparatus 70 and a FW method according to a second embodiment will be described with reference to FIGS. 5 and 6. The FW apparatus 70 according to the second embodiment illustrated in FIG. 5 primarily includes a winding section 72, a detection section 74, and a control section 76.

Figure 5:
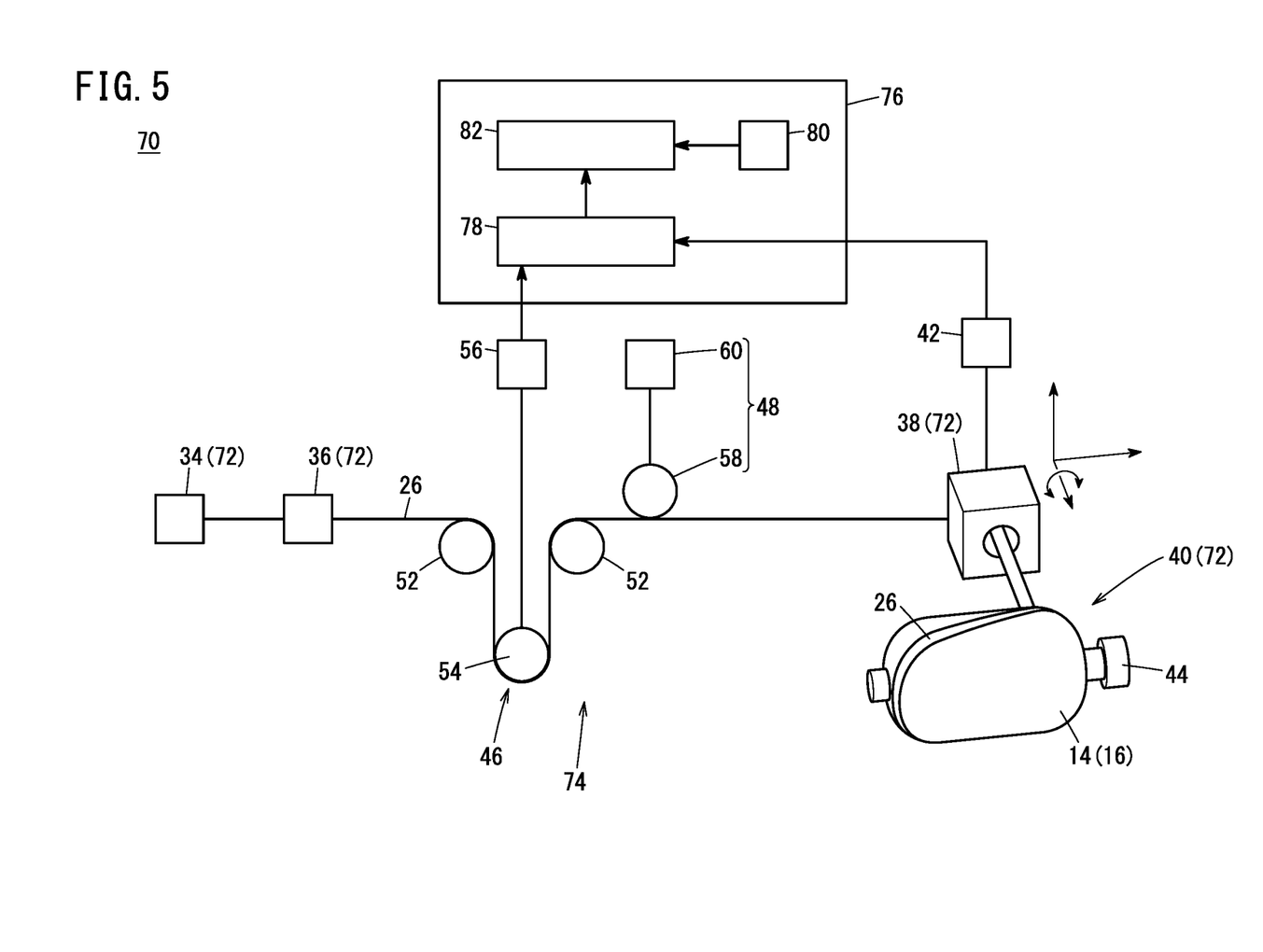
FIG. 5 is a schematic general view of a filament winding apparatus according to a second embodiment of the present invention.

The winding section 72 in FIG. 5 winds the fiber bundle 26 around the liner 14 by continuously changing the winding position of the fiber bundle 26 between the tubular portion 20 and the hemispherical portions 22 by the control of the control section 76.

The detection section 74 in FIG. 5 has a structure substantially identical to the structure of the detection section 30 in FIG. 1 except that the detection section 74 acquires, by the control of the control section 76, detected-value information including the detected value of the actual winding tension by the winding section 72 (detected winding-tension value) and the detected value of the actual winding position by the winding section 72 (detected winding-position value) associated with each other. That is, the detection section 74 includes the winding-position acquisition part 42 instead of the supply-speed acquisition part 48. Moreover, a processing part 78 of the detection section 74 associates the measurement results obtained by the tension acquisition part 46 with the measurement results obtained by the winding-position acquisition part 42.

Specifically, the processing part 78 acquires the detected-value information (solid line in FIG. 6) by associating the detected winding-tension value with the detected winding-position value obtained when the detected winding-tension value is measured. The detection section 74 may acquire correlation between the detected winding-position value and the detected winding-tension value shown by the continuous solid line in FIG. 6 (detected-values correlation) by respectively associating multiple results of the detected winding-tension value with multiple results of the detected winding-position value using the processing part 78.

A storage part 80 of the control section 76 stores correlation information in which the allowable determination range of the winding tension is set in relation to the winding position. In this embodiment, the correlation information is shown by two broken lines L2 and L3 in FIG. 6, and the space between the broken lines L2 and L3 corresponds to the allowable determination range. That is, when the winding position is P1, the allowable determination range of the winding tension is RP1. Moreover, when the winding position is P2, the allowable determination range of the winding tension is RP2.

The winding tension indicated by the allowable determination range is low when the winding position is at the hemispherical portions 22, and is high when the winding position is at the tubular portion 20. That is, the allowable determination range of the winding tension changes as the winding position changes. The numbers of waves of the detected-values correlation and the correlation information with wavy shapes in FIG. 6 correspond to the number of layers of the fiber bundle 26 formed by winding the fiber bundle 26 around the outer surface of the liner 14.

A determination part 82 of the control section 76 determines whether the winding of the fiber bundle 26 is successful or unsuccessful by comparing the detected-value information obtained by the detection section 74 with the correlation information stored in the storage part 80. Specifically, the determination part 82 determines whether the detected winding-tension value in the detected-value information is in the allowable determination range of the correlation information at the winding position (detected winding-position value) associated with the detected winding-tension value. The determination part 82 may determine whether the winding of the fiber bundle 26 is successful or unsuccessful by comparing the detected-values correlation obtained by the detection section 74 with the correlation information stored in the storage part 80.

Figure 6:
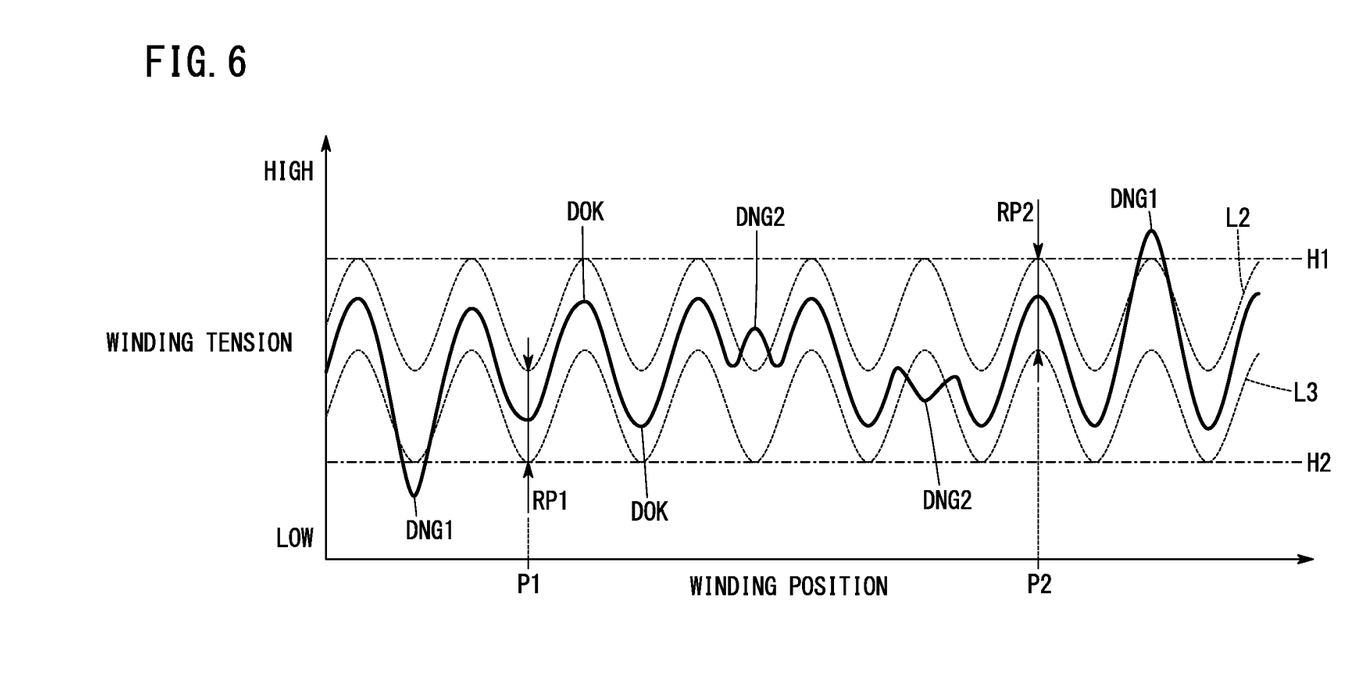
FIG. 6 illustrates detected-value information acquired by a detection section of the filament winding apparatus in FIG. 5 and correlation information set in advance.

For example, the determination part 82 may determine whether the detected-value information shown by the solid line in FIG. 6 is partially in the set allowable range between the broken lines L2 and L3, or may determine whether the detected-value information is in the set allowable range between the broken lines L2 and L3 entirely or at a percentage greater than or equal to a predetermined level.

In the FW method according to the second embodiment capable of being performed using the FW apparatus 70 configured as above, for example, the fiber bundle 26 is wound around the liner 14 in the winding step (S1 in FIG. 4). In the winding step, the fiber bundle 26 is unwound toward the liner 14 by rotating the unwinding roller in the unwinding mechanism 34 and, at the same time, the fiber bundle 26 is wound around the liner 14 while the liner 14 is rotated by the driving part 44 of the rotation support mechanism 40. At this moment, the control section 76 performs, for example, hoop winding or helical winding on the liner 14 by moving the winding head 38 and changing the winding position.

As the winding position changes as described above, the actual winding tension in the winding step often changes from the set value set by the tension adjustment mechanism 36. In this embodiment, the winding tension tends to be high when the winding position is at the tubular portion 20, and tends to be low when the winding position is at the hemispherical portions 22.

Next, in the detected-value acquiring step (S2 in FIG. 4), the winding tension in the winding step is detected to acquire the detected winding-tension value, and the winding position in the winding step is detected to acquire the detected winding-position value. Subsequently, the detected winding-tension value and the detected winding-position value acquired in the detected-value acquiring step are associated with each other to acquire the detected-value information.

Next, in the determining step (S3 in FIG. 4), the correlation information and the detected-value information are compared with each other to determine whether the winding of the fiber bundle 26 is successful or unsuccessful. In the determining step, it is determined whether the detected winding-tension value in the detected-value information is in the allowable determination range at the winding position (detected winding-position value) associated with the detected winding-tension value.

If it is determined that the detected winding-tension value in the detected-value information is within the allowable determination range described above (corresponding allowable determination range; YES in S3 in FIG. 4), it is determined that the winding is successful (S4 in FIG. 4). If it is determined that the detected winding-tension value in the detected-value information is out of the corresponding allowable determination range (NO in S3 in FIG. 4), it is determined that the winding is unsuccessful (S5 in FIG. 4).

The determining step of determining whether the winding of the fiber bundle 26 is successful or unsuccessful can be performed while the winding step is being performed or after the winding step is completed. In the case where the determining step is performed after the winding step is completed, multiple pieces of detected-value information, including multiple results of the detected winding-position value and multiple results of the detected winding-tension value acquired in the detected-value acquiring step associated with each other, are recorded. The resulting detected-values correlation may be compared with the correlation information to determine whether the winding is successful or unsuccessful.

As described above, in the FW apparatus 70 and the FW method according to the second embodiment, the correlation information in which the allowable determination range of the winding tension is set in relation to the winding position is determined in advance. Then, the detected-value information is acquired by associating the detected winding-tension value and the detected winding-position value with each other, the values being obtained when the fiber bundle 26 is actually wound around the liner 14. Subsequently, it is determined whether the winding of the fiber bundle 26 is successful or unsuccessful by comparing the detected-value information with the correlation information.

For example, in a case where the detected-value information is within the allowable determination range between the broken lines L2 and L3 indicating the correlation information as shown by DOK in FIG. 6, it is determined that the winding is successful. On the other hand, in a case where the detected-value information is out of the allowable determination range between the broken lines L2 and L3 indicating the correlation information as shown by DNG1 and DNG2 in FIG. 6, it is determined that the winding is unsuccessful.

For example, when the detected-value information shown by the solid line in FIG. 6 is compared with the upper threshold H1 and the lower threshold H2 of the winding tension shown by alternate long and short dash lines in FIG. 6, it can be determined that the winding is unsuccessful on the basis of the detected-value information shown by DNG1 only. That is, it cannot be determined that the winding is unsuccessful on the basis of the detected-value information shown by DNG2.

By contrast, in the FW apparatus 70 and the FW method according to the second embodiment, it can be determined that the winding is unsuccessful on the basis of not only the detected-value information shown by DNG1 but also the detected-value information shown by DNG2 between the upper threshold H1 and the lower threshold H2 as described above. In this manner, it can be accurately determined whether the winding of the fiber bundle 26 is successful or unsuccessful as it can be determined whether the detected winding-tension value is within the allowable determination range that changes according to the winding position of the fiber bundle 26.

In the FW apparatus 70 according to the second embodiment, the filament-wound member 16 corresponds to the liner 14 constituting the pressure vessel 12 and including the tubular portion 20 and the hemispherical portions 22, and the winding section 72 winds the fiber bundle 26 around the filament-wound member 16 by continuously changing the winding position between the tubular portion 20 and the hemispherical portions 22. Moreover, in the FW method according to the second embodiment, the filament-wound member 16 corresponds to the liner 14 constituting the pressure vessel 12 and including the tubular portion 20 and the hemispherical portions 22, and the fiber bundle 26 is wound around the filament-wound member 16 while the winding position is continuously changed between the tubular portion 20 and the hemispherical portions 22 in the winding step. It can be accurately determined whether the winding is successful or unsuccessful effectively, in particular, in the case where the winding position of the fiber bundle 26 wound around the liner 14 serving as the filament-wound member 16 is continuously changed.

The present invention is not limited in particular to the embodiments described above, and various modifications can be made thereto without departing from the scope of the present invention.

What is claimed is:

1. A filament winding apparatus that winds a fiber bundle impregnated with resin around a filament-wound member, the filament winding apparatus comprising:
    a winding section configured to wind the fiber bundle around the filament-wound member; and
    one or more processors,
    wherein the one or more processors:
    detect a winding tension of the fiber bundle wound by the winding section to acquire a detected winding-tension value;
    detect a supply speed of the fiber bundle wound by the winding section to acquire a detected supply-speed value;
    store correlation information in which an allowable determination range of the winding tension is set in relation to the supply speed;
    determine whether winding of the fiber bundle is successful or unsuccessful by comparing detected-value information, including the detected winding-tension value and the detected supply-speed value associated with each other, with the correlation information; and
    determine whether winding of the fiber bundle is successful or unsuccessful on a basis of whether the detected winding-tension value falls within the allowable determination range of the winding tension that is set in advance with respect to the supply speed.

2. The filament winding apparatus according to claim 1, wherein:
    the filament-wound member corresponds to a liner constituting a pressure vessel, and includes a tubular portion and a hemispherical portion; and the supply speed at the hemispherical portion is lower than the supply speed at the tubular portion.

3. A filament winding apparatus that winds a fiber bundle impregnated with resin around a filament-wound member, the filament winding apparatus comprising:
a winding section configured to wind the fiber bundle around the filament-wound member; and
one or more processors,
wherein the one or more processors:
detect a winding tension of the fiber bundle wound by the winding section to acquire a detected winding-tension value;
detect a winding position of the fiber bundle wound by the winding section to acquire a detected winding-position value;
store correlation information in which an allowable determination range of the winding tension is set in relation to the winding position;
determine whether winding of the fiber bundle is successful or unsuccessful by comparing detected-value information, including the detected winding-tension value and the detected winding-position value associated with each other, with the correlation information; and
determine whether winding of the fiber bundle is successful or unsuccessful on a basis of whether the detected winding-tension value falls within the allowable determination range of the winding tension that is set in advance with respect to the winding position.

4. The filament winding apparatus according to claim 3, wherein:
the filament-wound member corresponds to a liner constituting a pressure vessel, and includes a tubular portion and a hemispherical portion; and
the winding section winds the fiber bundle around the filament-wound member by continuously changing the winding position between the tubular portion and the hemispherical portion.

5. A filament winding method of winding a fiber bundle impregnated with resin around a filament-wound member, the filament winding method comprising:
winding the fiber bundle around the filament-wound member;
acquiring a detected winding-tension value by detecting a winding tension of the fiber bundle in the winding of the fiber bundle, and acquiring a detected supply-speed value by detecting a supply speed of the fiber bundle in the winding of the fiber bundle;
determining whether winding of the fiber bundle is successful or unsuccessful by comparing detected-value information, including the detected winding-tension value and the detected supply-speed value associated with each other, with correlation information in which an allowable determination range of the winding tension is set in relation to the supply speed; and
determining whether winding of the fiber bundle is successful or unsuccessful on a basis of whether the detected winding-tension value falls within the allowable determination range of the winding tension that is set in advance with respect to the supply speed.

6. The filament winding method according to claim 5, wherein:
the filament-wound member corresponds to a liner constituting a pressure vessel, and includes a tubular portion and a hemispherical portion; and
in the winding of the fiber bundle, the supply speed is lower when the fiber bundle is wound around the hemispherical portion than when the fiber bundle is wound around the tubular portion.

7. A filament winding method of winding a fiber bundle impregnated with resin around a filament-wound member, the filament winding method comprising:
winding the fiber bundle around the filament-wound member;
acquiring a detected winding-tension value by detecting a winding tension of the fiber bundle in the winding of the fiber bundle, and acquiring a detected winding-position value by detecting a winding position of the fiber bundle in the winding of the fiber bundle;
determining whether winding of the fiber bundle is successful or unsuccessful by comparing detected-value information, including the detected winding-tension value and the detected winding-position value associated with each other, with correlation information in which an allowable determination range of the winding tension is set in relation to the winding position; and
determining whether winding of the fiber bundle is successful or unsuccessful on a basis of whether the detected winding-tension value falls within the allowable determination range of the winding tension that is set in advance with respect to the winding position.

8. The filament winding method according to claim 7, wherein:
the filament-wound member corresponds to a liner constituting a pressure vessel, and includes a tubular portion and a hemispherical portion; and
in the winding of the fiber bundle, the fiber bundle is wound around the filament-wound member while the winding position is continuously changed between the tubular portion and the hemispherical portion.

* * * * *